(12) United States Patent
Hotta et al.

(10) Patent No.: US 10,260,443 B2
(45) Date of Patent: Apr. 16, 2019

(54) INTERNAL COMBUSTION ENGINE AND CONTROL METHOD THEREOF

(71) Applicant: TOYOTA JIDOSHA KABUSHIKI KAISHA, Toyota-shi, Aichi-ken (JP)

(72) Inventors: Takashi Hotta, Susono (JP); Koji Kitano, Susono (JP); Satoshi Taniguchi, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 52 days.

(21) Appl. No.: 14/691,942

(22) Filed: Apr. 21, 2015

(65) Prior Publication Data

US 2015/0308367 A1    Oct. 29, 2015

(30) Foreign Application Priority Data

Apr. 23, 2014   (JP) ................... 2014-089432

(51) Int. Cl.
   *F02D 41/10*   (2006.01)
   *F02D 19/08*   (2006.01)
   *F02D 41/34*   (2006.01)
   *F02D 41/04*   (2006.01)
   *F02D 41/00*   (2006.01)

(52) U.S. Cl.
   CPC ........... *F02D 41/34* (2013.01); *F02D 19/084* (2013.01); *F02D 19/087* (2013.01);
   (Continued)

(58) Field of Classification Search
   CPC .. F02D 19/06; F02D 19/0602; F02D 19/0605; F02D 19/0655; F02D 19/08;
   (Continued)

(56) References Cited

U.S. PATENT DOCUMENTS 5,899,192 A       5/1999   Tsutsumi et al.
2008/0312809 A1   12/2008  Hirata

FOREIGN PATENT DOCUMENTS

JP   H05-106498 A    4/1993
JP   H10-122013 A    5/1998
         (Continued)

OTHER PUBLICATIONS

English machine translation of JP 2005325704 A provided by Espacenet.*

(Continued)

*Primary Examiner* — Jacob M Amick
*Assistant Examiner* — Michael A Kessler
(74) *Attorney, Agent, or Firm* — Hunton Andrews Kurth LLP

(57) ABSTRACT

A controller for an internal combustion engine that has a port injection valve and is capable of running on a gasoline/alcohol mixed fuel comprises: load detecting means that detects a load during operation of the internal combustion engine; alcohol concentration detecting means that detects an alcohol concentration of the mixed fuel; and synchronous fuel injection increasing means that increases a fuel injection amount in a synchronous injection period in response to the load when the load detected by the load detecting means is higher than a predetermined load value and the alcohol concentration detected by the alcohol concentration detecting means is higher than a predetermined concentration value, the synchronous injection period being a period in which a period in which an intake valve is opened and a period in which the mixed fuel is injected from the port injection valve overlap with each other.

6 Claims, 3 Drawing Sheets

(52) U.S. Cl.
CPC ......... *F02D 41/0025* (2013.01); *F02D 41/04* (2013.01); *F02D 41/10* (2013.01); *F02D 41/105* (2013.01); *F02D 2200/0611* (2013.01); *Y02T 10/36* (2013.01); *Y02T 10/44* (2013.01)

(58) Field of Classification Search
CPC .... F02D 19/081; F02D 19/082; F02D 19/084; F02D 19/087; F02D 41/34; F02D 41/40; F02D 41/3836
See application file for complete search history.

(56) References Cited

FOREIGN PATENT DOCUMENTS

| | | | | | |
|---|---|---|---|---|---|
| JP | 2005325704 | A | * | 11/2005 | ............ F02M 51/00 |
| JP | 2007-332936 | A | | 12/2007 | |
| JP | 2008-309036 | A | | 12/2008 | |
| JP | 2009-281216 | A | | 12/2009 | |
| JP | 2012136959 | A | * | 7/2012 | ............ F02D 41/34 |

OTHER PUBLICATIONS

"Alcohol". Encyclopdia Britannica. Encyclopdia Britannica Online. Encyclopaedia Britannica Inc., 2017. Web. Apr. 20, 2017 <https://www.britannica.com/science/alcohol>. Last updated Feb. 12, 2011.*
Human English Translation of Yamamoto et al. JP 2005325704.*
Human English Translation of Tadayuki Nagai Yamamoto et al. JP 20091203.*
English machine translation of JP2007332936 A provided by Espacent.*

* cited by examiner

INTERNAL COMBUSTION ENGINE AND CONTROL METHOD THEREOF

CROSS-REFERENCE TO RELATED APPLICATION

The present application claims priority to Japanese Patent Application No. 2014-089432 filed on Apr. 23, 2014, which is incorporated herein by reference in its entirety.

BACKGROUND OF THE INVENTION

Field of the Invention

The present invention relates to an internal combustion engine, a control method thereof, and a controller therefor.

Background Art

There are some known internal combustion engines that can run on a gasoline/alcohol mixed fuel. For example, Patent Literature 1 (Japanese Patent Laid-Open No. 2009-281216) discloses an internal combustion engine that performs a control to increase the fuel injection amount to increase the engine torque during high load operation and, in the fuel injection amount increasing control, makes a correction to decrease the increment of the fuel injection amount as the alcohol concentration of the fuel increases. Such a correction can prevent occurrence of engine torque variations due to variations of alcohol concentration of the fuel during high load operation.

Other prior art includes Japanese Patent Laid-Open No. 10-122013 and Japanese Patent Laid-Open No. 5-106498.

With an internal combustion engine that runs on a gasoline/alcohol mixed fuel, unburned alcohol or water produced by combustion may react with calcium in oil on the wall of the bore of the combustion chamber to form calcium carbonate, calcium sulfate or other deposits. Such deposits increase the sliding friction between the wall of the bore and the piston ring. As a result, the smoothness of the movement of the piston is likely to decrease.

SUMMARY OF THE INVENTION

The present invention has been devised to solve the problem described above. An object of the present invention is to provide an internal combustion engine that runs on a gasoline/alcohol mixed fuel, a control method thereof, and a controller therefor that can prevent the smoothness of the movement of the piston from being decreasing because of a deposit, such as calcium carbonate or calcium sulfate.

In order to attain the object described above, an internal combustion engine capable of running on a gasoline/alcohol mixed fuel according to a first aspect of the present invention includes a port injection valve, a crank angle sensor, an intake air pressure sensor, at least one of an alcohol concentration sensor and an air/fuel ratio sensor, and a controller. The controller is programmed to (i) detect a load during operation of the internal combustion engine by using a signal from the crank angle sensor and a signal from the intake air pressure sensor, (ii) detect an alcohol concentration of the mixed fuel by using a signal from the at least one of the alcohol concentration sensor and the air/fuel ratio sensor, and (iii) increase a fuel injection amount in a synchronous injection period in response to the load when the detected load is higher than a predetermined load value and the detected alcohol concentration is higher than a predetermined concentration value. The synchronous injection period is a period in which a period in which an intake valve is opened and a period in which the mixed fuel is injected from the port injection valve overlap with each other.

According to a second aspect of the present invention, in the first aspect of the present invention, the controller increases the fuel injection amount by increasing the synchronous injection period in response to the load.

According to a third aspect of the present invention, in the first aspect of the present invention, the controller increases the fuel injection amount by increasing an injection pressure of the mixed fuel in the synchronous injection period in response to the load.

According to a fourth aspect of the present invention, in the first aspect of the present invention, the controller increases the fuel injection amount by increasing the synchronous injection period and increasing an injection pressure of the mixed fuel in the synchronous injection period in response to the load.

In order to attain the object described above, a control method of an internal combustion engine according to a fifth aspect of the present invention is provided. The engine has a port injection valve and is capable of running on a gasoline/alcohol mixed fuel. The method includes the steps of: detecting a load during operation of the internal combustion engine; detecting an alcohol concentration of the mixed fuel; and increasing a fuel injection amount in a synchronous injection period in response to the load when the detected load is higher than a predetermined load value and the detected alcohol concentration is higher than a predetermined concentration value, the synchronous injection period being a period in which a period in which an intake valve is opened and a period in which the mixed fuel is injected from the port injection valve overlap with each other.

In order to attain the object described above, a controller for an internal combustion engine according to a sixth aspect of the present invention is a controller for an internal combustion engine that has a port injection valve and is capable of running on a gasoline/alcohol mixed fuel. The controller includes load detecting means, alcohol concentration detecting means, and synchronous fuel injection increasing means. The load detecting means detects a load during operation of the internal combustion engine. The alcohol concentration detecting means detects an alcohol concentration of the mixed fuel. The synchronous fuel injection increasing means increases a fuel injection amount in a synchronous injection period in response to the load when the load detected by the load detecting means is higher than a predetermined load value and the alcohol concentration detected by the alcohol concentration detecting means is higher than a predetermined concentration value, the synchronous injection period being a period in which a period in which an intake valve is opened and a period in which the mixed fuel is injected from the port injection valve overlap with each other.

According to the present invention, the amount of fuel on the wall of the bore can be increased, and the wall of the bore can be cooled by the increased amount of fuel when the fuel evaporates. In addition, oil on the wall of the bore is diluted with the increased amount of fuel on the wall of the bore. As a result, the calcium in the oil is less likely to react with water and therefore is less likely to form a deposit. Thus, even when the alcohol concentration is high, that is, even when the water concentration is high, the calcium in the oil can prevented from reacting with the water in the fuel to form a deposit on the wall of the bore.

DETAILED DESCRIPTION OF THE PREFERRED EMBODIMENTS

[Configuration of System According to Embodiment]

Figure 1:
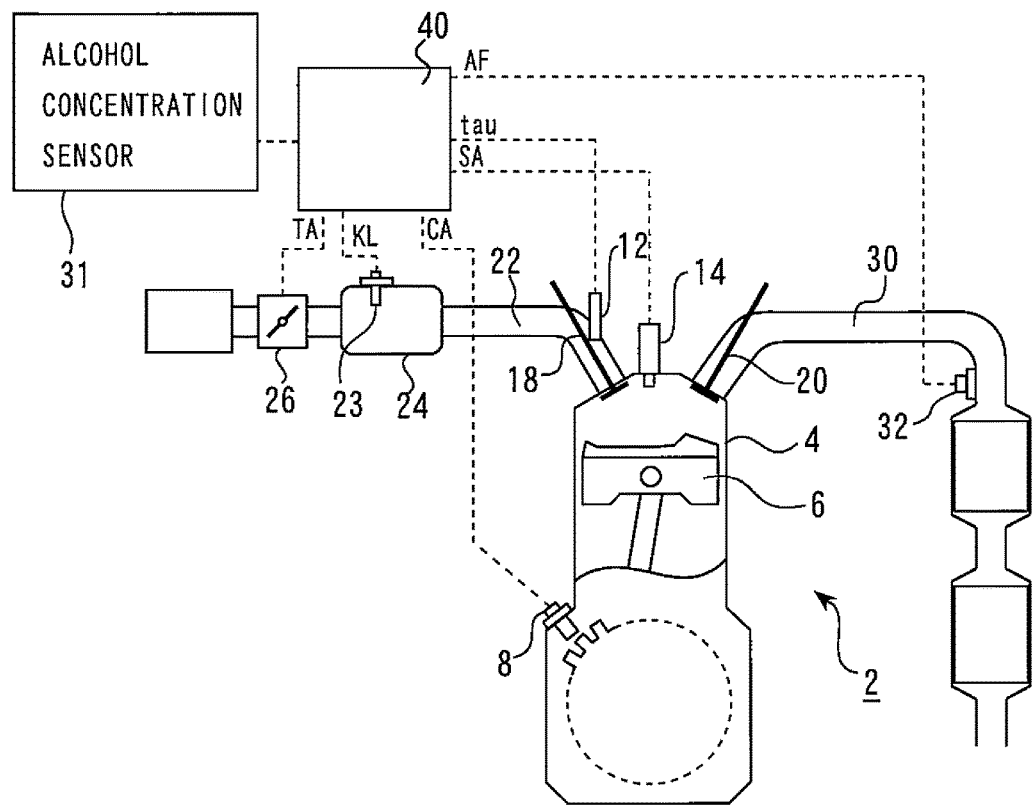
FIG. 1 is a diagram showing a configuration of a controller for an internal combustion engine according to an embodiment of the present invention and a configuration of the internal combustion engine to which the controller is applied.

FIG. 1 is a diagram showing a configuration of a controller for an internal combustion engine according to an embodiment of the present invention and a configuration of the internal combustion engine to which the controller is applied. As shown in FIG. 1, a system according to this embodiment includes an internal combustion engine 2 used as a motive power source for a vehicle. The internal combustion engine 2 has a cylinder 4. Although FIG. 1 shows only one cylinder, an engine of a vehicle typically comprises a plurality of cylinders.

The internal combustion engine 2 is an FFV engine capable of running on a gasoline/alcohol mixed fuel (referred to as a mixed fuel, hereinafter). Examples of the alcohol include methyl alcohol or ethyl alcohol.

Each cylinder 4 is provided with an intake valve 18 that opens and closes an intake port to a combustion chamber and an exhaust valve 20 that opens and closes an exhaust port to the combustion chamber. The intake port of each cylinder 4 is in communication with an intake channel 22. The intake channel 22 is provided with a surge tank 24. The surge tank 24 is provided with an intake air pressure sensor 23. A throttle valve 26 is disposed upstream of the surge tank 24. The exhaust port of each cylinder is in communication with an exhaust channel 30. An air/fuel ratio sensor 32 is attached to the exhaust channel 30 at a point downstream of a point where the exhaust channel 30 is merged with the exhaust channels from the other cylinders.

A piston 6 is disposed in each cylinder 4. The piston 6 is connected to a crankshaft via a crank mechanism. A crank angle sensor 8 is provided in the vicinity of the crankshaft. The crank angle sensor 8 is a sensor that provides an output responsive to the rotational angle of the crankshaft. The internal combustion engine 2 is provided with an injector 12 that injects fuel into the intake channel 22 and a spark plug 14 that ignites an air/fuel mixture in the combustion chamber. The injector 12 is provided in the intake port and is positioned to inject fuel toward the back side of the intake valve. An alcohol concentration sensor 31 is attached to a fuel system of the internal combustion engine 2. For example, the alcohol concentration sensor 31 is attached to a fuel tank or a fuel channel extending from the fuel tank to the cylinder.

The system according to this embodiment is provided with an arithmetic processing unit 40. An engine electronic control unit (ECU) that is responsible for control of the internal combustion engine 2 may serve as the arithmetic processing unit 40. On an input side thereof, the arithmetic processing unit 40 receives outputs of various sensors, including an output CA of the crank angle sensor 8, an output KL of the intake air pressure sensor 23, and an output AF of the air/fuel ratio sensor 32. The arithmetic processing unit 40 calculates the engine load based on the output CA of the crank angle sensor 8 and the output KL of the intake air pressure sensor 23. On an output side thereof, the arithmetic processing unit 40 is connected to the injector 12, the spark plug 14, a throttle motor and various other actuators. The arithmetic processing unit 40 executes a predetermined program based on input information from the various sensors to make the various actuators operate.

The predetermined program executed by the arithmetic processing unit 40 includes a synchronous fuel injection increasing control. In the synchronous fuel injection increasing control, the temperature of the wall of the bore of the cylinder 4 can be decreased, thereby preventing occurrence of a deposit on the wall of the bore of the cylinder. In the following, the synchronous fuel injection increasing control will be described with reference to FIG. 2.

[Synchronous Fuel Injection Increasing Control]

Figure 2:
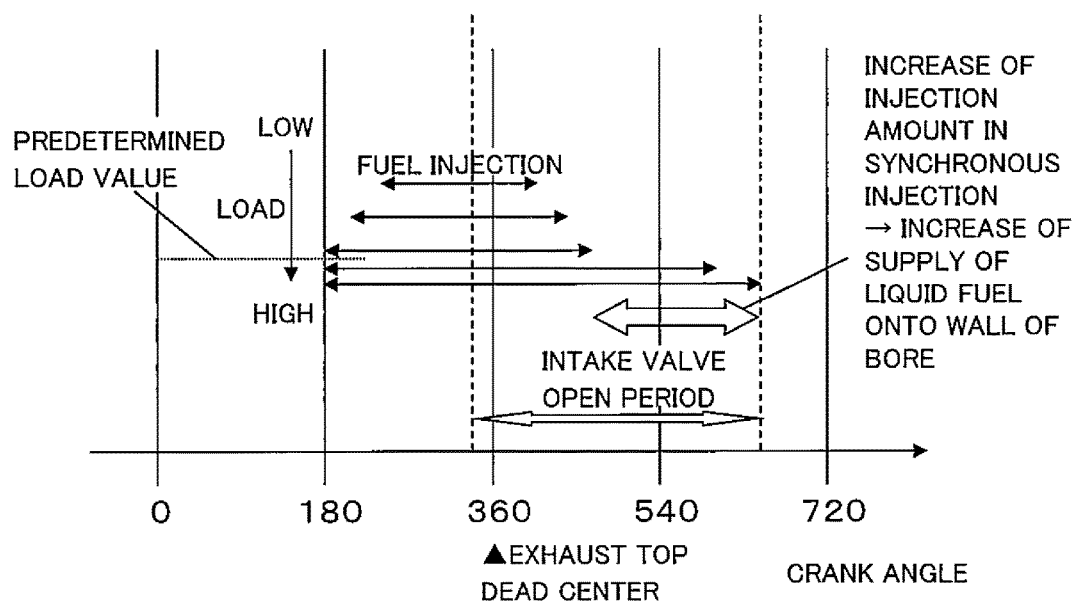
FIG. 2 is a diagram for illustrating a synchronous fuel injection increasing control in the internal combustion engine according to the embodiment.

FIG. 2 is a diagram for illustrating the synchronous fuel injection increasing control in the internal combustion engine 2 according to the embodiment. FIG. 2 shows how the fuel injection period changes in response to the engine load. As shown in FIG. 2, as the engine load increases, the required amount of fuel injection increases, and therefore, the fuel injection period also increases. A fuel injection control performed when the engine load is equal to or lower than a predetermined load value is referred to herein as a normal fuel injection control. In the normal fuel injection control, both the asynchronous injection period and the synchronous injection period increase as the engine load increases. The "predetermined load value" refers to the value of the load at a temperature above which a deposit is likely to occur in the cylinder 4 and is optimally set based on an experimental result.

When the engine load is higher than the predetermined load value, the synchronous fuel injection increasing control is performed. In the synchronous fuel injection increasing control, the asynchronous injection period is fixed, and only the synchronous injection period is increased in response to the engine load.

In the synchronous fuel injection increasing control, only the fuel injection amount in synchronous injection after the exhaust top dead center increases. As a result, the amount of fuel on the wall of the bore increases. And the wall of the bore can be cooled by the increased amount of fuel when the fuel evaporates. In addition, oil on the wall of the bore is diluted with the increased amount of fuel on the wall of the bore. In the synchronous fuel injection increasing control, the temperature of the wall of the bore and the oil concentration thus decreases, so that the calcium in the oil is less likely to react with water and therefore is less likely to form a deposit. Thus, even when the alcohol concentration is high, that is, even when the water concentration is high, the calcium in the oil can prevented from reacting with the water in the fuel to form a deposit on the wall of the bore.

[Fuel Injection Period Controlling Routine]

Figure 3:
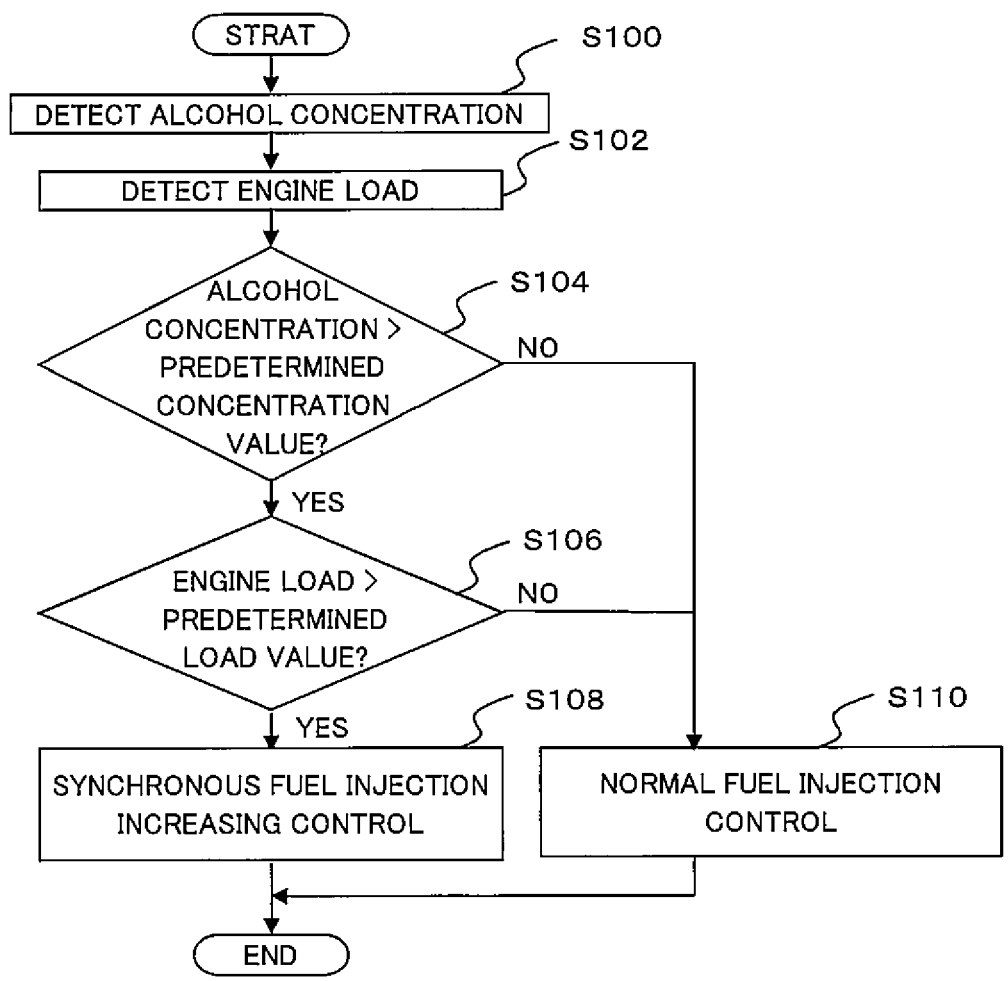
FIG. 3 is a flowchart showing a routine performed by an ECU in the embodiment.

FIG. 3 is a flowchart showing a routine performed by an ECU in the embodiment. The ECU has a memory that stores the routine. The ECU has a processor that executes the routine stored in the memory.

First, the ECU detects the alcohol concentration (S100). The ECU detects the alcohol concentration based on the output of the alcohol concentration sensor 31.

The ECU then detects the engine load (S102). The ECU detects the engine load based on the output CA of the crank angle sensor 8 and the output KL of the intake air pressure sensor 23.

The ECU then determines whether or not the alcohol concentration detected in S100 is higher than a predetermined concentration value (S104). If the ECU determines that the alcohol concentration detected in S100 is equal to or lower than the predetermined concentration value, the ECU performs the normal fuel injection control (S110). After that, this routine ends. The "predetermined concentration value" refers to the value of the alcohol concentration above which the oil on the wall of the bore and the water in the fuel mixture are likely to be mixed and to form a deposit, and is optimally set based on an experimental result.

If the ECU determines that the alcohol concentration detected in S100 is higher than the predetermined concentration value, the ECU determines whether or not the engine load detected in S102 is higher than a predetermined load value (S106). If ECU determines that the engine load detected in S102 is equal to or lower than the predetermined load value, the ECU performs the normal fuel injection control (S110). After that, this routine ends.

If the ECU determines that the engine load detected in S102 is higher than the predetermined load value, the ECU performs the synchronous fuel injection increasing control (S108). The synchronous fuel injection increasing control is a control to increase only the synchronous injection period in response to the load described above with reference to FIG. 2. After that, this routine ends.

Although the alcohol concentration sensor 31 is used to detect the alcohol concentration in the above description, the present invention is not limited to this implementation, and the alcohol concentration may be calculated by estimation means. For example, the alcohol concentration may be estimated from a correction amount in a feedback control using the air/fuel ratio sensor 32.

Although the fuel injection period is increased to increase the synchronous fuel injection amount in the above description, the present invention is not limited to this implementation. For example, the fuel injection period may be fixed, and the fuel injection pressure of the injector 12 may be increased to increase the synchronous fuel injection amount. Alternatively, the process of increasing the duel injection period and the process of increasing the fuel injection pressure may be used in combination.

The "alcohol concentration detecting means" in one of the aspects of the present invention is implemented by the ECU performing the step S100 described above, the "load detecting means" in the one of the aspects of the present invention is implemented by the ECU performing the step S102 described above, and the "synchronous fuel injection increasing means" in the one of the aspects of the present invention is implemented by the ECU performing the step S108 described above.

The invention claimed is:

1. An internal combustion engine capable of running on a gasoline/alcohol mixed fuel comprising:
a port injection valve;
a crank angle sensor;
an intake air pressure sensor;
at least one of an alcohol concentration sensor and an air/fuel ratio sensor; and
a controller programmed to:
(i) detect a load during operation of the internal combustion engine by using a signal from the crank angle sensor and a signal from the intake air pressure sensor,
(ii) detect an alcohol concentration of the mixed fuel by using a signal from the at least one of the alcohol concentration sensor and the air/fuel ratio sensor, and
(iii) increase a mixed fuel injection amount in a synchronous injection period in response to the engine load when the detected engine load is higher than a predetermined load value and the detected alcohol concentration is higher than a predetermined concentration value, the synchronous injection period being a period in which a period in which an intake valve is opened and a period in which the mixed fuel is injected from the port injection valve overlap with each other, while fixing a mixed fuel injection amount for an asynchronous injection period to be greater than zero, the asynchronous injection period being a period within the injection period of the mixed fuel in which the injection period of the mixed fuel does not overlap with the opening period of the intake valve, wherein
the synchronous injection period is set on and after exhaust top dead center.

2. The internal combustion engine according to claim 1, wherein the controller is programmed to increase the fuel injection amount by increasing the synchronous injection period in response to the load.

3. The internal combustion engine according to claim 1, wherein the controller is programmed to increase the fuel injection amount by increasing an injection pressure of the mixed fuel in the synchronous injection period in response to the load.

4. The internal combustion engine according to claim 1, wherein the controller is programmed to increase the fuel injection amount by increasing the synchronous injection period and increasing an injection pressure of the mixed fuel in the synchronous injection period in response to the load.

5. A control method of an internal combustion engine that has a port injection valve and is capable of running on a gasoline/alcohol mixed fuel, the method comprising the steps of:
detecting a load during operation of the internal combustion engine;
detecting an alcohol concentration of the mixed fuel; and
increasing a mixed fuel injection amount in a synchronous injection period in response to the engine load when the detected engine load is higher than a predetermined load value and the detected alcohol concentration is higher than a predetermined concentration value, while fixing a mixed fuel injection amount for an asynchronous injection period to be greater than zero, the synchronous injection period being a period in which a period in which an intake valve is opened and a period in which the mixed fuel is injected from the port injection valve overlap with each other, the asynchronous injection period being a period within the injection period of the mixed fuel in which the injection period of the mixed fuel does not overlap with the opening period of the intake valve, wherein
the synchronous injection period is set on and after exhaust top dead center.

6. A controller for an internal combustion engine that has a port injection valve and is capable of running on a gasoline/alcohol mixed fuel, the controller comprising:
load detecting means that detects a load during operation of the internal combustion engine;
alcohol concentration detecting means that detects an alcohol concentration of the mixed fuel; and
synchronous fuel injection increasing means that increases a mixed fuel injection amount in a synchronous injection period in response to the engine load when the engine load detected by the load detecting means is higher than a predetermined load value and the alcohol concentration detected by the alcohol concentration detecting means is higher than a predetermined concentration value, while fixing a mixed fuel injection amount for an asynchronous injection period to be greater than zero, the synchronous injection period being a period in which a period in which an intake valve is opened and a period in which the mixed fuel is injected from the port injection valve overlap with each other, the asynchronous injection period being a period within the injection period of the mixed fuel in which the injection period of the mixed fuel does not overlap with the opening period of the intake valve, wherein the synchronous injection period is set on and after exhaust top dead center.

\* \* \* \* \*